United States Patent
Phillips

(10) Patent No.: US 7,255,104 B2
(45) Date of Patent: Aug. 14, 2007

(54) BREATHING GAS SUPPLY SYSTEM

(75) Inventor: Robert John Phillips, Honiton (GB)

(73) Assignee: Honeywell Normalair-Garrett (Holdings) Limited, Yeovil, Somerset (GB)

( * ) Notice: Subject to any disclaimer, the term of this patent is extended or adjusted under 35 U.S.C. 154(b) by 568 days.

(21) Appl. No.: 10/800,238

(22) Filed: Mar. 12, 2004

(65) Prior Publication Data

US 2005/0126570 A1    Jun. 16, 2005

Related U.S. Application Data

(63) Continuation of application No. PCT/GB03/00727, filed on Feb. 21, 2003.

(30) Foreign Application Priority Data

Mar. 1, 2002    (GB) ................. 0204886.6

(51) Int. Cl.
*A61M 16/00* (2006.01)
*B64D 13/02* (2006.01)

(52) U.S. Cl. ................. 128/204.22; 128/204.18; 244/118.5

(58) Field of Classification Search .......... 96/108–111, 96/121, 130, 133, 143; 95/95, 97, 98, 8, 95/23, 90, 104, 105, 130; 128/200.24, 201.28, 128/201.29, 202.11, 202.26, 202.27, 204.18, 128/201.25, 205.11, 205.25, 206.21; 244/118.5
See application file for complete search history.

(56) References Cited

U.S. PATENT DOCUMENTS

| | | | | |
|---|---|---|---|---|
| 4,359,328 A | * | 11/1982 | Wilson | 95/98 |
| 4,449,990 A | * | 5/1984 | Tedford, Jr. | 95/26 |
| 4,543,109 A | * | 9/1985 | Hamlin et al. | 95/98 |
| 4,927,434 A | * | 5/1990 | Cordes et al. | 95/15 |
| 4,928,682 A | * | 5/1990 | Stevenson et al. | 128/202.26 |
| 4,960,119 A | * | 10/1990 | Hamlin | 128/204.18 |
| 5,004,485 A | * | 4/1991 | Hamlin et al. | 96/111 |
| 5,071,453 A | * | 12/1991 | Hradek et al. | 96/111 |
| 5,199,423 A | * | 4/1993 | Harral et al. | 128/202.26 |
| 5,531,807 A | * | 7/1996 | McCombs | 95/26 |
| 5,590,852 A | * | 1/1997 | Olson | 244/118.5 |
| 5,642,729 A | * | 7/1997 | Cassidy | 128/204.29 |
| 5,733,359 A | * | 3/1998 | Doong et al. | 95/8 |
| 5,809,999 A | * | 9/1998 | Lang | 128/200.24 |
| 5,858,063 A | * | 1/1999 | Cao et al. | 95/11 |
| 6,077,331 A | * | 6/2000 | Phillips | 95/12 |
| 6,383,256 B1 | * | 5/2002 | Phillips | 95/12 |
| 6,558,451 B2 | * | 5/2003 | McCombs et al. | 95/98 |
| 6,669,758 B1 | * | 12/2003 | Hart et al. | 95/8 |

(Continued)

*Primary Examiner*—Justine R. Yu
*Assistant Examiner*—Shumaya Ali
(74) *Attorney, Agent, or Firm*—MacMillan, Sobanski & Todd, LLC

(57) ABSTRACT

A breathing gas supply system for supplying breathable gas in an aircraft includes an oxygen enriching apparatus which is operable in at least two modes to provide product gas with varying oxygen concentrations. A first feed line feeds more highly enriched product gas to one or more breathing gas outlets, and a second feed line feeds less highly enriched product gas e.g. to an aircraft cabin for breathing during normal high altitude flight. A control means controls oxygen enrichment apparatus to provide highly enriched product gas to the breathing gas outlet or outlets in the first mode of operation or less highly enriched product gas e.g. to the cabin for normal breathing, and controls a diverter valve. Which directs the product gas to the respective feed line.

12 Claims, 2 Drawing Sheets

U.S. PATENT DOCUMENTS

| | | | |
|---|---|---|---|
| 6,701,923 B2 * | 3/2004 | Cazenave et al. | 128/204.22 |
| 6,712,876 B2 * | 3/2004 | Cao et al. | 95/10 |
| 6,846,347 B2 * | 1/2005 | Phillips et al. | 95/8 |
| 6,923,183 B2 * | 8/2005 | Martinez et al. | 128/206.27 |
| 6,948,498 B2 * | 9/2005 | Cazenave et al. | 128/204.22 |
| 6,997,970 B2 * | 2/2006 | Crome | 95/8 |
| 7,055,780 B2 * | 6/2006 | Phillips | 244/118.5 |
| 2003/0233936 A1 * | 12/2003 | Crome | 95/96 |
| 2004/0040437 A1 * | 3/2004 | Cao et al. | 95/21 |
| 2004/0083886 A1 * | 5/2004 | Phillips et al. | 95/138 |
| 2004/0244585 A1 * | 12/2004 | Meckes et al. | 95/138 |

* cited by examiner

BREATHING GAS SUPPLY SYSTEM

CROSS-REFERENCE TO RELATED APPLICATIONS

This is a continuation of PCT patent application No. PCT/GB03/00727 filed Feb. 21, 2003. Priority is claimed to United Kingdom patent application Ser. No. 0204886.6 filed Mar. 1, 2002.

This invention relates to a breathing gas system for supplying breathable gas in an aircraft to aircrew and/or passengers.

It is known to provide a supply of compressed oxygen or oxygen enriched gas in an aircraft for emergency use, for example in the event of a cabin depressurisation at high altitude. Such supply is usually contained in gas bottles which are heavy and bulky. Accordingly it is usual to provide only a limited emergency gas supply sufficient for breathing while the aircraft altitude is reduced to an altitude where the ambient air may be breathed.

During normal flight, a substantial proportion of the cabin air which is breathed is recirculated, and this results in a deterioration in air quality particularly noticeable on long haul flights. However to refresh the cabin air by decreasing the proportion of air which is recirculated can incur a significant cost penalty in terms of fuel consumption, as ambient air would need to be pressurised up to cabin pressure and possibly heated, before it can be introduced into the cabin for breathing, although compressed air from an engine compressor may be used but this usually needs cooling before it can be used.

In any event, even if a greater proportion of the cabin air was replenished, the maximum oxygen concentration in the cabin air cannot be greater than in the ambient air, but the partial pressure of the oxygen will be less than ideal because the cabin is not pressurised to sea level but to about 5-8000 ft above sea level. Hence the concentration of oxygen in normally breathed air in an aircraft flying at typical cruising altitudes of 35-40,000 ft say, is always, with conventional systems, less than desirable.

It is known to use a molecular sieve bed type of apparatus to adsorb non-oxygen gas from compressed air which may be bled from the aircraft engine or engines, and thus supply a product gas for breathing at pressure, which is highly enriched in oxygen. However such apparatus are themselves heavy and bulky and have not been widely adopted for civilian aircraft use where fuel economy is a prime consideration, but are more usually used in military aircraft to provide a supply of breathing for aircrew when the aircraft is operating at altitude and/or on high G-manoeuvres in non-pressurised cabins.

According to a first aspect of the invention we provide a breathing gas supply system for supplying breathable gas in an aircraft including an oxygen enriching apparatus which is operable in at least two modes to provide product gas with varying oxygen concentrations, a first feed line to feed more highly enriched product gas to one or more breathing gas outlets, and a second feed line to feed less highly enriched product gas for breathing, and a control means to control the oxygen enrichment apparatus to provide highly enriched product gas to the breathing gas outlet or outlets in the first mode of operation or less highly enriched product gas for breathing, and to control a diverter valve which directs the product gas to the respective feed line.

Preferably in the first mode of operations the more highly enriched product gas is fed to a plurality of gas outlets e.g. for emergency use, and in the second mode of operation the less highly enriched product gas is fed to an aircraft cabin for breathing during normal high altitude flight.

Thus in a system in accordance with the invention, the function of providing for a supply of breathable gas in the event of an emergency decompression may be achieved in a common apparatus which provides for the function of providing oxygen enriched gas to the aircraft cabin for normal breathing. The problem of economically providing for fresh cabin air is ameliorated, by supplying oxygen enriched air to the cabin, without having separate normal breathing and emergency breathing systems, but a common system is provided for both.

Preferably the oxygen enriching apparatus includes a plurality of molecular sieve beds which are operable cyclically to adsorb non-oxygen gas during a charging phase to produce product gas for breathing, and de-adsorb non-oxygen gas to atmosphere during a venting phase to clean the bed of non-oxygen gas.

Desirably, the product gas produced in the second mode of operation has about a 40-60% oxygen concentration and more particularly about 50%, whilst the product gas produced in the first mode of operation has about a 70-90% oxygen concentration, and more typically about 80%. However preferably the product gas produced in the second mode of operation is diluted, for example with recirculated cabin air e.g. from an air conditioning unit, prior to introduction into the cabin for normal breathing so that the oxygen concentration of the air breathed normally in the cabin is not significantly greater than that of ambient air, so as not to present a fire risk for example. Typically the concentration of air breathed in the cabin is arranged to be about 22-23%.

It is known to control the concentration of oxygen in the product gas to achieve a desired oxygen concentration e.g. for altitude, by varying the charge to vent ratio during an operating period, or to maintain the ratio fixed and change the operating period. To perform such control it is necessary to provide an oxygen sensor to sense the concentration of oxygen in the product gas and a sophisticated control means.

Alternatively it is known to operate the molecular sieve beds of the oxygen enriching apparatus to produce a maximum concentration of oxygen, and then to dilute the highly enriched product gas to achieve a desired oxygen concentration for breathing.

Generally a molecular sieve bed operates most efficiently to produce a given flow of product gas with a maximum oxygen concentration with a charge to vent ratio of 1:1 but operating an oxygen enriching apparatus which includes a plurality of molecular sieve beds most efficiently, whilst being able to accommodate varying operating conditions i.e. varying product gas demand and varying oxygen concentration, is not straightforward, because different size and hence weight molecular sieve beds operate most efficiently to produce different concentrations of oxygen for a given flow of product gas. For example if it is desired to produce a given flow of product gas with say, 50% oxygen, there is an optimum size of molecular sieve bed, which will be different to that producing a different given flow of oxygen gas with say, 80% oxygen concentration.

In accordance with the present invention preferably the oxygen enriching apparatus includes N molecular sieve beds and in the first mode of operation X beds are operated to produce the highly enriched product gas at a flow rate of Y, where X<N, and in the second mode of operation all N beds are operated to produce the less highly enriched product gas at a flow rate Z, where Z is greater than Y.

It will be appreciated that a greater volume of product gas will need to be produced for normal cabin breathing than for emergency use and thus normal cabin breathing represents the greatest demand for product gas volume.

By providing the minimum capacity apparatus necessary to meet the maximum envisaged demand, the size and weight of the oxygen enriching apparatus may be optimised.

Preferably the control means is capable of switching the oxygen enriching apparatus between operating modes and of optimising use of the oxygen enriching apparatus when operating at less than maximum demand. For example the control means may be programmed to select X of the N molecular sieve beds to operate when less than the maximum demand is required to be fulfilled, and an operating cycle to operate those selected beds most efficiently.

During maximum demand, in the second mode of operation, when all N beds are operated, preferably each bed is operated in sequence with a charge to vent ratio of about 1:N so that each bed is charging i.e. adsorbing non-oxygen gas and producing product gas, for about an equivalent time in any operating period, and venting for the maximum time possible.

In the first mode of operation when X of the N beds is operating, each of the X beds may be operated in sequence with a charge to vent ratio of about 1:X so that each bed is charging i.e. adsorbing non-oxygen gas and producing product gas, for about an equivalent time in any operating period, and venting for the maximum time possible, while the non-selected N-X beds are not operated.

However in conditions of lesser demand, the X beds may alternatively be operated optimally to match the production of breathable gas to the demand. For example the X beds may be operated with a variable or fixed charge to vent ratio, in accordance with prior art practices.

According to a second aspect of the invention we provide an aircraft including a breathing gas supply system according to the first aspect of the invention.

According to a third aspect of the invention we provide a method of operating a breathing gas supply system of the first aspect of the invention including providing more highly enriched product gas to the one or more breathing gas outlets in a first operating mode, and providing less highly enriched product gas for breathing in a second operating mode.

The invention will now be described with reference to the accompanying drawings in which.

Figure 1:
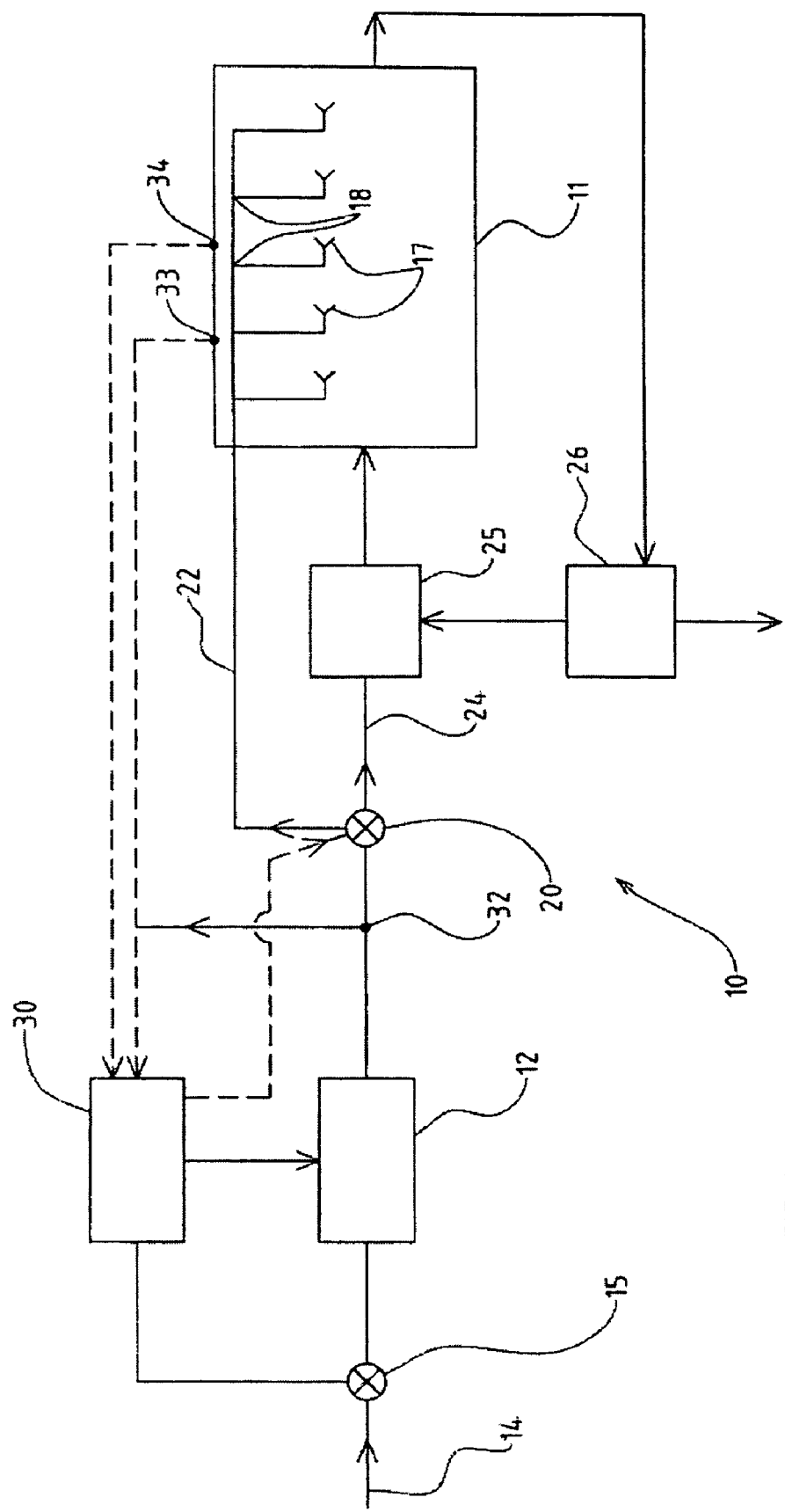
FIG. 1 is a schematic view of a breathing gas supply system in accordance with the invention.
Figure 2:
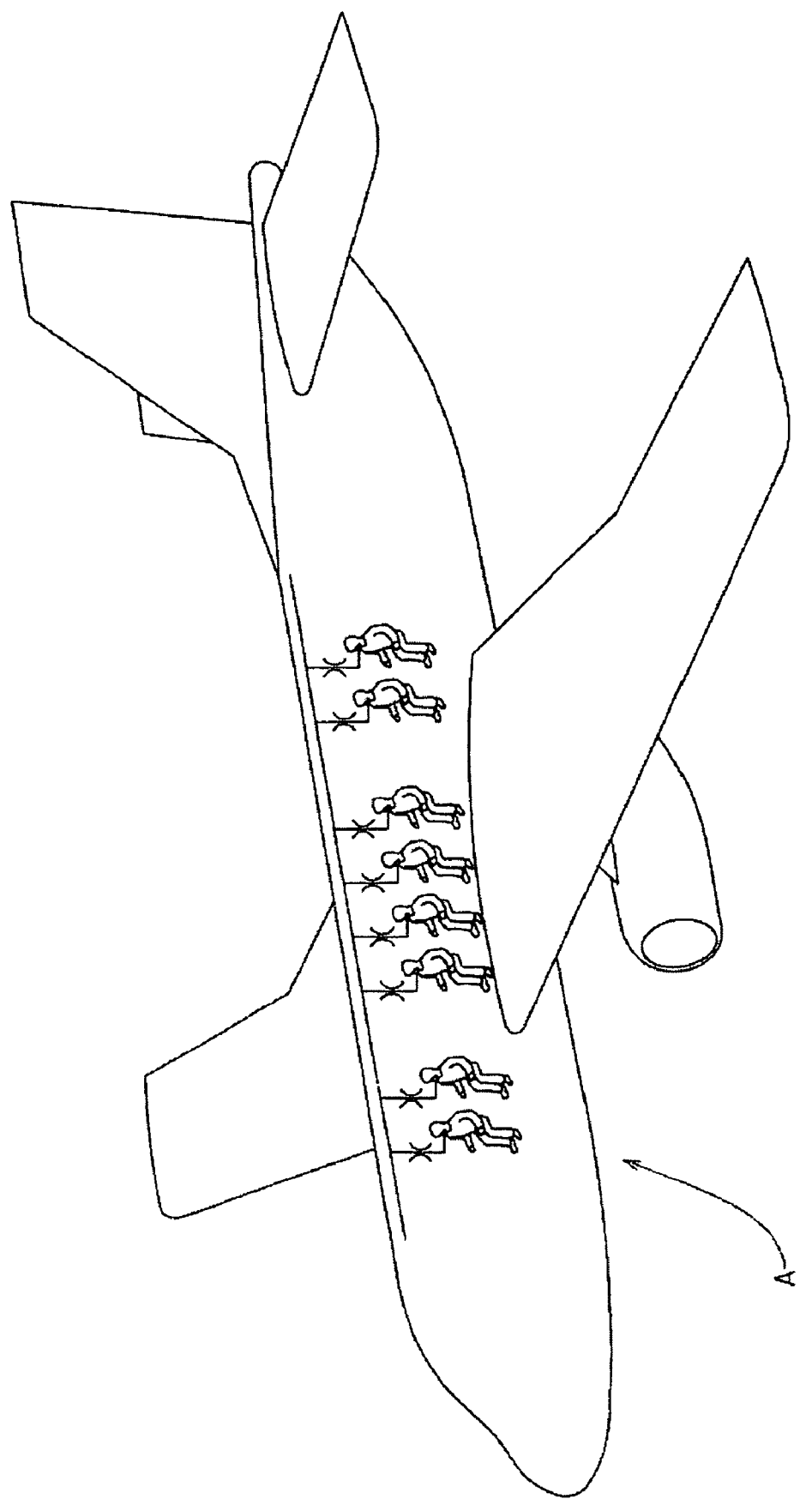
FIG. 2 is an illustrated view of an aircraft having the breathing gas supply system of FIG. 1.

Referring to the drawings, a breathing gas supply system 10 for supplying breathable gas to aircrew and/or passengers in an aircraft A cabin 11, includes an oxygen enriching apparatus 12 which in this example includes a plurality of molecular sieve beds, i.e. N beds, each of which is operable cyclically to adsorb non-oxygen gas from a compressed air supply 14, during a charging phase to produce product gas for breathing, and de-adsorb non-oxygen gas and ventilate to atmosphere during a venting phase to clean the bed of non-oxygen gas.

The compressed air supply 14 is derived in this example from an engine compressor, and air flow to and vented air flow from the beds of the oxygen enriching apparatus 10 is controlled by a control valve 15 arrangement which is illustrated in a simplified form only.

In use, the oxygen enriching apparatus 12 provides product gas either to the aircraft cabin 11 for normal breathing, or to breathing masks 17 in the cabin for emergency use, for example in the case of a sudden emergency cabin 11 decompression, depending on the position of a diverter valve 20.

When the diverter valve 20 is in a first position, product gas is fed into a first feed line 22 to which are connected, the breathing masks 17, for example via "T" valves 18. When the diverter valve 20 is in a second position, product gas is fed into a second feed line 24, and hence to the cabin 11 for normal breathing via a mixing apparatus 25 to which recirculated cabin air from a cabin air conditioning unit 26 may be provided, to dilute the product gas prior to its introduction into the cabin 11.

The diverter valve 20 is controlled by a control means 30 which also controls the charge/vent valve arrangement 15, and the operation of the molecular sieve beds of the oxygen enriching apparatus 12 too.

The volume of product gas required to be introduced into the cabin 11 for normal breathing will be substantially greater than the volume of product gas required for emergency breathing. This is because some cabin air is exhausted from the cabin 11 in order to control the temperature within the cabin 11, which air has to be replaced. However the concentration of oxygen in the product gas will be required to be much lower for normal breathing than in an emergency situation when the cabin pressurization is lost.

The greatest demand for product gas is for normal breathing because of the high product gas flow required. The molecular sieve beds of the oxygen enriching apparatus 12 may optimally be operated in an aircraft flying at typical cruising altitudes, to produce for a maximum gas flow, an oxygen concentration of about 50% in the product gas.

Hence in designing an oxygen enriching apparatus 12, the maximum capacity of product gas production is to be catered for is for a given product gas flow with such an oxygen concentration. However this is too great a concentration for normal breathing in the pressurised cabin, and accordingly the product gas is diluted in the mixing apparatus by mixing the 50% concentration oxygen in the second feed line 24 with recirculated cabin air to achieve a desired oxygen concentration in the product gas/recirculated air mixture fed to the cabin 11. For a cabin pressurised at say, 5000 ft, desirably the oxygen concentration in the product gas/recirculated air is in the order of 22-23%.

Where there is maximum demand for product gas, the N molecular sieve beds of the oxygen enriching apparatus 12 are preferably operated sequentially with a charge to vent ratio of 1:N. Thus each bed will be adsorbing non-oxygen gas from the compressed air supply 14 a generally equal amount so that the beds will age equally, and each bed will be vented for the maximum period possible in any operating period.

In the first mode of operation of the oxygen enriching apparatus 12 when highly concentrated oxygen enriched product gas is required for breathing in an emergency decompression situation, a smaller volume of product gas will be required and so the amount of compressed air fed to the oxygen enriching apparatus 12 can be reduced. At the same time, even though a more highly concentrated product gas is required, because the gas flow is reduced the demand on the oxygen enriching apparatus 12 is reduced. Thus all N molecular sieve beds need not continue to be operated. Rather X beds of the N may be selected by the control means 30 for operation.

The X beds of the oxygen enriching apparatus 12 may be operated sequentially with a charge to vent ratio of 1:X. Thus each of the X beds will be adsorbing non-oxygen gas from the compressed air supply 14 a generally equal amount and each bed will be vented for the maximum period possible in any operating period. If desired to ensure that all the N beds will age equally, the X beds selected to be operated in the first mode of operation may be sequenced.

However the selected X beds may be alternatively controlled for optimal operation. For example a pair or pairs of the molecular sieve beds of the oxygen enriching apparatus 12 may be operated with a variable charge to vent ratio, or alternative fixed charge to vent ratios or otherwise to achieve a desired flow of product gas with a desired oxygen concentration.

Desirably the oxygen concentration in the product gas in the first mode of operation which is diverted by the diverter valve 20 to the first feed line 22, is about 80% which is adequate to sustain life at typical civilian aircraft cruising altitudes of around 40,000 ft. in a depressurised cabin 11.

Because the emergency supply is provided by an oxygen enrichment apparatus 12, there is no need, as with conventional systems which utilise a limited supply of compressed oxygen stored for emergency use, for the aircraft height rapidly to be reduced to a lower altitude, say 10,000 ft at which ambient air may comfortable be breathed, but if desired the aircraft cruising height may be maintained or more probably, the aircraft altitude reduced in a much slower and comfortable manner than is necessary with conventional systems in an emergency decompression situation.

In the second mode of operation, when demand on the oxygen enrichment apparatus 12 is at a maximum, preferably all N beds are operated, in sequence, with a charge to vent ratio of about 1:N so that each bed is charging i.e. Absorbing non-oxygen gas and producing product gas, for about an equivalent time in any operating period, and venting for the maximum time possible.

In the figure it can be seen that there is an oxygen monitor 32 downstream of the oxygen enriching apparatus 12 but upstream of the diverter valve 20, to monitor the correct operation of the oxygen enriching apparatus 12. The input to the control means 30 from the oxygen monitor 32 may be used by the control means to determine an operating regime for the selected X beds of the oxygen enriching apparatus 12. Also, there is an oxygen sensor 33 in the cabin 11 to provide another input to the control means 30, to check and/or take remedial action in the event that the oxygen concentration in the cabin falls below or exceeds acceptable levels. There may also be provided an altitude sensor 34 which may provide another input to the control means 30 to enable the concentration of oxygen in the cabin air to be closely controlled depending on altitude, if desired.

Various modifications may be made without departing from the scope of the invention. For example in the first mode of operation, instead of supplying product gas for an emergency decompression situation, product gas from the oxygen enrichment apparatus 12 may be used for other purposes such as for a supply of highly concentrated oxygen gas for therapeutic purposes, where for example the aircraft is carrying sick or injured passengers, or for an oxygen supply for aircrew only.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A breathing gas supply system for supplying breathable gas in an aircraft including an oxygen enriching apparatus which is operable in at least two modes to provide product gas with varying oxygen concentrations, a first feed line to feed more highly enriched product gas to one or more breathing gas outlets, and a second feed line to feed less highly enriched product gas to an aircraft cabin for breathing during normal high altitude flight, and a controller to control the oxygen enrichment apparatus to provide highly enriched product gas to the breathing gas outlet or outlets in the first mode of operation or less highly enriched product gas to an aircraft cabin for breathing during normal high altitude flight, and to control a diverter valve which directs the product gas to the respective feed line.

2. A system according to claim 1 wherein in the first mode of operation the more highly enriched product gas is fed to a plurality of gas outlets.

3. A system according to claim 1 wherein the oxygen enriching apparatus includes a plurality of molecular sieve beds which are operable cyclically to adsorb non-oxygen gas during a charging phase to produce product gas for breathing, and de-adsorb non-oxygen gas to atmosphere during a venting phase to clean the bed of non-oxygen gas, the product gas produced in the second mode of operation having about a 40-60% oxygen concentration, whilst the product gas produced in the first mode of operation has about a 70-90% oxygen concentration.

4. A system according to claim 1 wherein the oxygen enriching apparatus includes a plurality of molecular sieve beds which are operable cyclically to adsorb non-oxygen gas during a charging phase to produce product gas for breathing, and de-adsorb non-oxygen gas to atmosphere during a venting phase to clean the bed of non-oxygen gas, the product gas produced in the second mode of operation having about a 50% oxygen concentration whilst the product gas produced in the first mode of operation has about an 80% oxygen concentration.

5. A system according to claim 1 wherein the product gas produced in the second mode of operation is diluted for use by being diluted for use with recirculated cabin air prior to introduction into the cabin for normal breathing so that the oxygen concentration of the air breathed normally in the cabin is not significantly greater than that of ambient air.

6. A breathing gas supply system for supplying breathable gas in an aircraft including an oxygen enriching apparatus which is operable in at least two modes to provide product gas with varying oxygen concentrations, a first feed line to feed more highly enriched product gas to one or more breathing gas outlets, and a second feed line to feed less highly enriched product gas for breathing, and a controller to control the oxygen enrichment apparatus to provide highly enriched product gas to the breathing gas outlet or outlets in the first mode of operation or less highly enriched product gas for breathing, and to control a diverter valve which directs the product gas to the respective feed line, wherein the oxygen enriching apparatus includes a plurality of molecular sieve beds which are operable cyclically to adsorb non-oxygen gas during a charging phase to produce product gas for breathing, and de-adsorb non-oxygen gas to atmosphere during a venting phase to clean the bed of non-oxygen gas, the product gas produced in the second mode of operation having about a 40-60% oxygen concentration, whilst the product gas produced in the first mode of operation has about a 70-90% oxygen concentration, and wherein the oxygen enriching apparatus includes a first number N molecular sieve beds, and in the first mode of operation a second number X molecular sieve beds less than the first number N are operated to produce the highly enriched product gas at a flow rate of Y, and in the second mode of operation all N molecular sieve beds are operated to produce the less highly enriched product gas at a flow rate Z, where Z is greater than Y.

7. A system according to claim 6 wherein the controller is capable of switching the oxygen enriching apparatus between operating modes and of optimizing use of the oxygen enriching apparatus when operating at less than maximum demand.

8. A system according to claim 7 wherein the controller is programmed to select a third-number X of the N molecular sieve beds to operate when less than the maximum demand is required to be fulfilled, and an operating cycle to operate those selected beds.

9. A system according to claim 6 wherein in the second mode of operation, all N beds are operated, and each bed is operated in sequence with a charge-to-vent ratio of about 1:N.

10. A system according to claim 6 wherein in the first mode of operation when X of the N beds is operating, each of the X beds is operated in sequence with a charge to vent ratio of about 1:X.

11. An aircraft including a breathing gas supply system including an oxygen enriching apparatus which is operable in at least two modes to provide product gas with varying oxygen concentrations, a first feed line to feed more highly enriched product gas to one or more breathing gas outlets in an aircraft cabin, and a second feed line to feed less highly enriched product gas to the aircraft cabin for breathing during normal high altitude flight, and a controller to control the oxygen enrichment apparatus to provide highly enriched product gas to the breathing gas outlet or outlets in the first mode of operation or less highly enriched product gas to the aircraft cabin for breathing during normal high altitude flight in the second mode, and to control a diverter valve which directs the product gas to the respective feed line.

12. A method for supplying breathing gas to occupants of an aircraft cabin during high altitude flight comprising the steps of providing an oxygen enriching apparatus which is operable in at least two modes to provide product gas with varying oxygen concentrations, controlling the oxygen enrichment apparatus to provide highly enriched product gas when in a first operating mode and less highly enriched product gas for breathing when in a second operating mode, providing the more highly enriched product gas from the apparatus to one or more emergency breathing gas outlets in the aircraft cabin in the first operating mode, and providing the less highly enriched product gas from the apparatus to the aircraft cabin for breathing by occupants during normal high altitude flight in the second operating mode.

* * * * *